United States Patent
Weyershausen et al.

(10) Patent No.: US 7,931,747 B2
(45) Date of Patent: Apr. 26, 2011

(54) HYDROPHOBIZED CEMENT-CONTAINING COMPOSITIONS

(75) Inventors: Bernd Weyershausen, Essen (DE); Stefan Stadtmueller, Muelheim (DE); Markus Roos, Essen (DE); Frank Koenig, Gelsenkirchen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 12/641,892

(22) Filed: Dec. 18, 2009

(65) Prior Publication Data
US 2010/0154682 A1 Jun. 24, 2010

(30) Foreign Application Priority Data
Dec. 19, 2008 (DE) .......... 10 2008 063 965

(51) Int. Cl.
C04B 24/40 (2006.01)
C04B 24/12 (2006.01)
(52) U.S. Cl. .......... 106/806; 106/724; 106/727
(58) Field of Classification Search .......... 106/724, 106/806, 727
See application file for complete search history.

(56) References Cited

U.S. PATENT DOCUMENTS

| | | | |
|---|---|---|---|
| 5,091,002 A * | 2/1992 | Schamberg et al. | 106/2 |
| 6,617,391 B2 | 9/2003 | Krakenberg et al. | |
| 6,743,835 B2 | 6/2004 | Schafer et al. | |
| 7,026,499 B2 | 4/2006 | Buskies et al. | |
| 7,105,233 B2 | 9/2006 | Bechthold et al. | |
| 7,361,777 B2 | 4/2008 | Herrwerth et al. | |
| 2008/0034794 A1 | 2/2008 | Ebbrecht et al. | |
| 2008/0200576 A1 | 8/2008 | Seiler et al. | |
| 2008/0216708 A1 | 9/2008 | Herrwerth et al. | |

FOREIGN PATENT DOCUMENTS

| | | |
|---|---|---|
| JP | 2003-327461 A * | 11/2003 |
| WO | WO02090287 | 11/2002 |

OTHER PUBLICATIONS

U.S. Appl. No. 12/370,733, filed Feb. 13, 2009, entitled, "Reactive, Liquid Ceramic Binder".
U.S. Appl. No. 12/535,756, filed Aug. 5, 2009, entitled, "Hydrophobizing Construction Elements Comprising Mineral Fibres".

* cited by examiner

*Primary Examiner* — Anthony J Green
(74) *Attorney, Agent, or Firm* — Scully, Scott, Murphy & Presser, P.C.

(57) ABSTRACT

The present invention relates to cement-containing compositions which are characterized in that they have a proportion of organosilicon compounds of greater than 0.15% by weight, based on the proportion of cement, the organosilicon compounds being based on at least one organosilicon compound selected from the group consisting of the alkoxysilanes and at least one selected from the group consisting of the alkoxysiloxanes, to a process for the preparation thereof and to the use thereof.

19 Claims, 6 Drawing Sheets

HYDROPHOBIZED CEMENT-CONTAINING COMPOSITIONS

FIELD OF THE INVENTION

The invention relates to novel hydrophobized cement-containing compositions and a process for the preparation thereof.

BACKGROUND OF THE INVENTION

Cement-like materials and compositions, such as, for example, adhesives, concrete and building materials, precast concrete parts and concrete ware which can be produced therefrom, such as, for example, pipes, wall segments or paving slabs, are frequently used in walls, in floors, in roofs and the like, or alternatively they are used for the production thereof. The cement-like materials are frequently exposed to water which can penetrate into the cement-like materials since such materials are generally porous. By using suitable aggregates or additives and formulations which can be prepared therewith, this inherent porosity can be reduced to a relatively great extent. However, complete avoidance of porosity cannot usually be achieved. An entire industry is therefore searching for methods which permit the materials mentioned above to be made water-repellent and hence to be protected from water.

Two methods have proved to be promising, an internal one and an external one. The internal method consists in adding a hydrophobing—water-repellent—substance or a reactive substance which produces a certain water-repellent effect after reaction or hardening is complete to a liquid mixture based on cement as a binder prior to hardening. Commercial substances which have been successfully used to date for this purpose are fatty acid-based materials, in particular stearates and oleates. For achieving good hydrophobing (water-repellent) effects, however, the addition of relatively large amounts of hydrophobing or reactive substances is necessary, and it is for this reason that a marked influence of these substances on the other material properties of the hardened cement-based materials cannot be ruled out.

Such a change in the other material properties can be substantially ruled out if external methods are used for hydrophobing. In these methods, the hydrophobing or reactive substances are applied to the hardened cement-based materials. Usually, low-viscosity substances or pastes are used, the active substances of which can penetrate into the pores, such as, for example, organosilicon compounds. The low-viscosity substances or pastes can be used, for example, in the form of aqueous emulsions. However, the low-viscosity substances or pastes can also be used as a mixture with other solvents or even directly if the organosilicon materials are sufficiently fluid per se. In order to achieve a sufficient water-repellent effect, multiple treatments of the cement-based materials are frequently necessary. This and the subsequent treatment of the hardened materials make the external method relatively complicated.

It has been proposed to add organosilicon materials as admixtures to cement-based mixtures in order to combine the good hydrophobing properties of these substances on the surfaces on subsequent external impregnation with the advantage of the easy use of stearates and oleates. The organosilicon materials have been used in the form of aqueous emulsions of hydrolysable silicon-hydrogen compounds.

In WO 02/090287, this method was further developed in that an aqueous emulsion of an organosilicon material, which emulsion has 0.25 to 4.5% by weight of alkoxysilanes and 0.1 to 2.0% by weight of alkoxysiloxanes, is added to a liquid cement-based mixture. The proportion of emulsion, based on the cement-containing composition, is 0.1 to 2%. The maximum proportion of organosilicon compounds in the cement-containing mixture is thus 6.5%×2%=0.13% by weight. The maximum proportion of organosilicon compounds in the cement-containing mixture is thus 0.35%×0.1%=0.00035% by weight. According to Example C of the aforementioned publication, an emulsion which has a solids content of 30% is diluted by addition of 9 parts of water. This dilute emulsion is used with a proportion of 1.1% by weight, based on the proportion of cement, in Example C. Thus, the proportion of organosilicon compounds, based on the cement-containing composition, is 0.033% by weight.

In addition to the damage to structures and building materials or products thereof by penetrating water, such as, for example, damage by frost, and leaching, salt displacement and spalling due to the formation of salt with water of hydration, which as a rule are suppressed by the use of in particular external water repellents, so-called efflorescence will also occur on various materials of the construction, e.g., exposed concrete, cast stones or bricks.

In addition to the purely aesthetic impairment of the overall visual appearance, for example in the case of concrete paving slabs or building facades, efflorescence phenomena on the material surfaces can also lead to limitations in the material properties, such as, for example, to a deterioration of the heat insulation properties or a decrease in the mechanical strength owing to leaching of the binder.

Secondary efflorescence is understood as meaning the effect that salts are dissolved by penetrating water and, by capillary transport, reach the surface where they remain as salt residue after evaporation of the water. This effect can be suppressed by subsequent hydrophobing.

However, efflorescence occurs even during the preparation of cement-bound systems, which cannot be suppressed by hydrophobing which is carried out subsequently. Efflorescence which occurs during the preparation is usually referred to as primary efflorescence. Primary efflorescence is presumably due to the fact that calcium hydroxide present is converted on the material surface with carbon dioxide from air into insoluble calcium carbonate.

SUMMARY OF THE INVENTION

The present invention provides an improved process for hydrophobing cement-based/cement-containing materials. In particular, the effect of efflorescence (secondary and optionally primary) can be prevented. Primary efflorescence is to be understood as meaning the formation/deposition of salt crystals or salt-like crystals on the surface of cement-based/cement-containing materials during the preparation, in particular the hardening of the materials. The formation of such primary efflorescence can, as mentioned above, lead to damage to the material.

Surprisingly, the applicants of the present application have found that cement-containing compositions which have a proportion of organosilicon compounds of greater than 0.15% by weight, based on the proportion of cement, the organosilicon compounds being based in each case on at least one organosilicon compound selected from the group consisting of the alkoxysilanes and of the alkoxysiloxanes, have substantially better water-repellent properties than the cement-based compositions described in the prior art.

The present invention therefore relates to cement-containing compositions which are characterized in that the compositions have a proportion of organosilicon compounds of greater than 0.15% by weight, based on the proportion of cement, the organosilicon compounds being based on at least one organosilicon compound selected from the group consisting of the alkoxysilanes and at least one selected from the group consisting of the alkoxysiloxanes.

The present invention also relates to a process for increasing the water impermeability and/or reducing primary efflorescence of hardened cement-containing compositions by addition of an aqueous emulsion which has organosilicon compounds that are based on at least one compound selected from the group consisting of the alkoxysilanes and at least one compound selected from the group consisting of the alkoxysiloxanes to a cement-containing, flowable mixture, characterized in that emulsion is added to the mixture in an amount such that the proportion of the organosilicon compounds in the cement-containing composition is greater than 0.15% by weight, based on the proportion of cement.

The process according to the invention has the advantage that it is possible to dispense with a complicated subsequent hydrophobing of the cement-containing composition. The cement-containing compositions according to the invention have the advantage that the water impermeability thereof is improved compared with the compositions described in the prior art. The compositions according to the invention also have the advantage that the occurrence of efflorescence is reduced. In particular, the compositions according to the invention have the advantage that the occurrence of primary efflorescence is reduced or prevented.

DETAILED DESCRIPTION OF THE INVENTION

Figure 1:
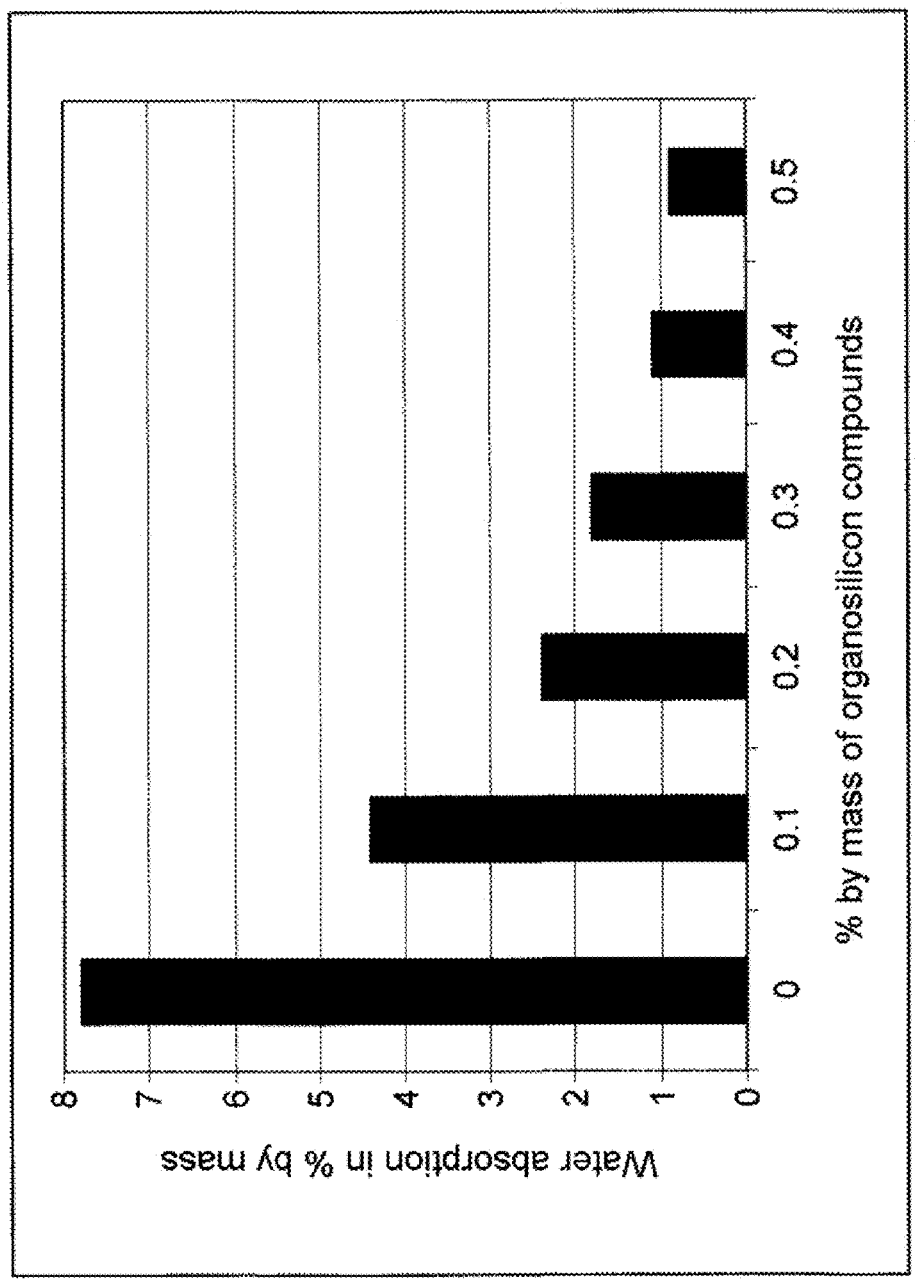
FIG. 1 shows the dependence of the water absorption on the proportion of the organosilicon compound in the form of a graph.
Figure 2A:
FIGS. 2A-2D are photographs of the test specimens according to Example 8.0 after a test time according to Example 9 of one hour (1 h), 24 hours (24 h), one week (1 W) and two weeks (2 W), respectively.
Figure 2B:
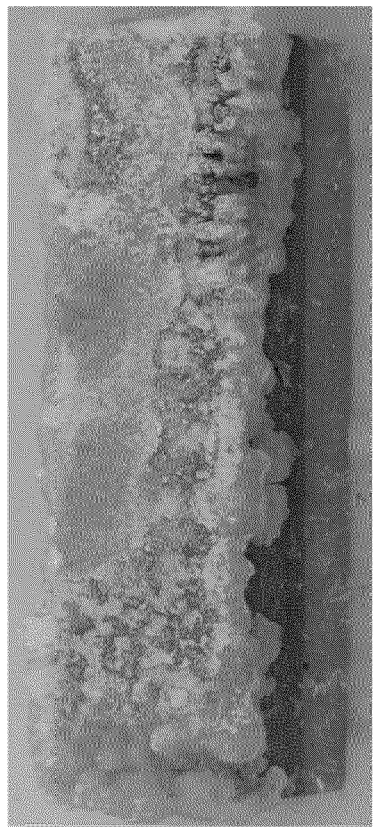
Figure 2C:
Figure 2D:
Figure 3A:
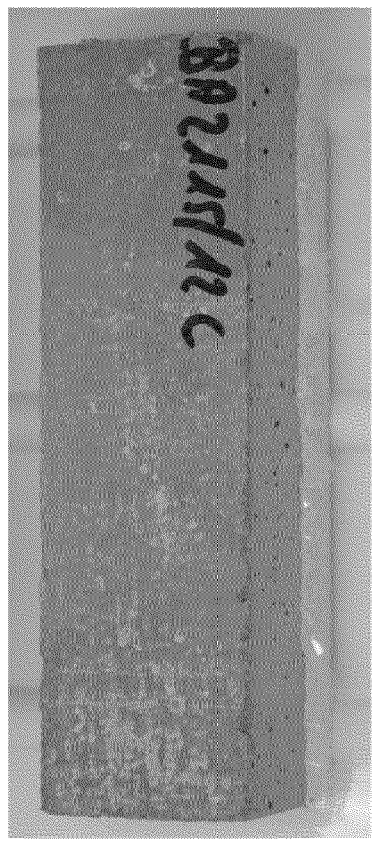
FIGS. 3A-3D are photographs of the test specimens according to Example 8.1c after a test time according to Example 9 of one hour (1 h), 24 hours (24 h), one week (1 W) and two weeks (2 W), respectively.
Figure 3B:
Figure 3C:
Figure 3D:
Figure 4A:
FIGS. 4A-4D are photographs of the test specimens according to Example 8.2c after a test time according to Example 9 of one hour (1 h), 24 hours (24 h), one week (1 W) and two weeks (2 W), respectively.
Figure 4B:
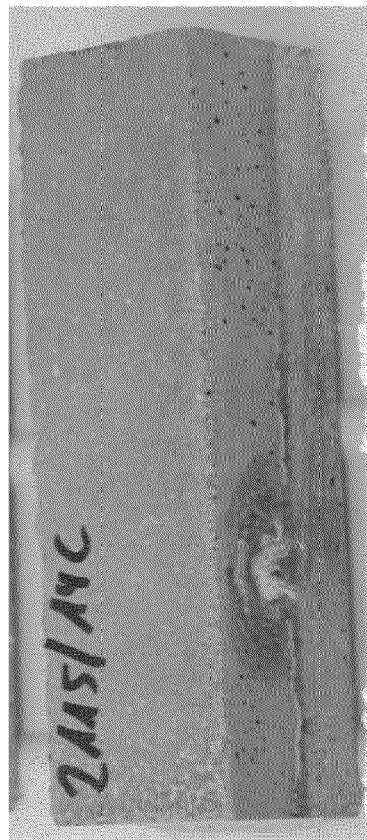
Figure 4C:
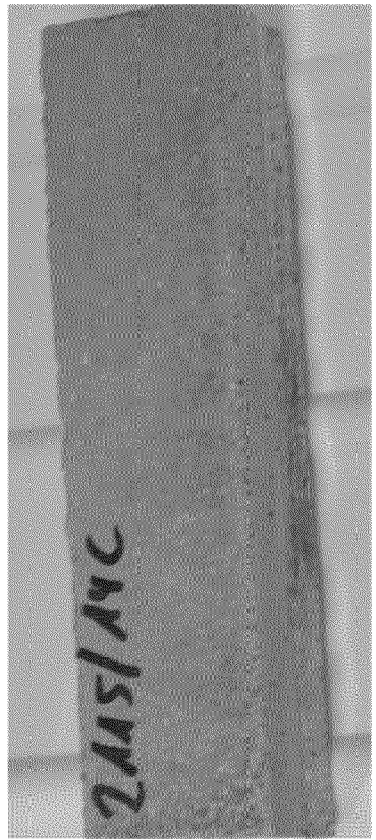
Figure 4D:
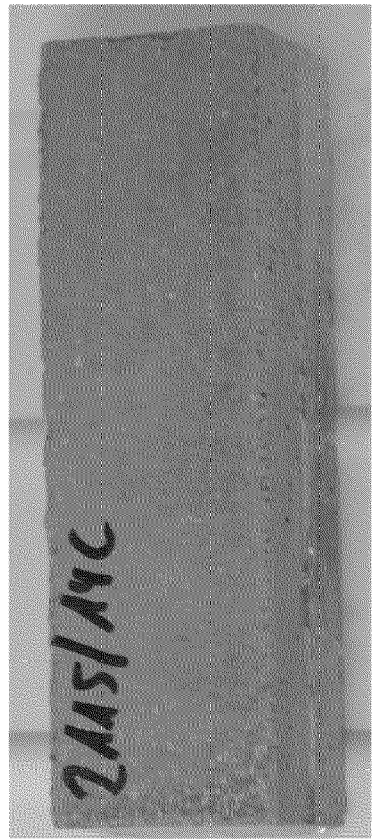
Figure 5A:
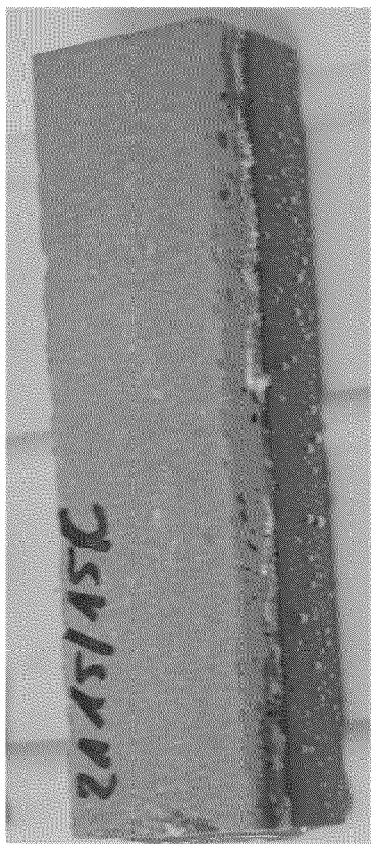
FIGS. 5A-5D are photographs of the test specimens according to Example 8.3c after a test time according to Example 9 of one hour (1 h), 24 hours (24 h), one week (1 W) and two weeks (2 W), respectively.
Figure 5B:
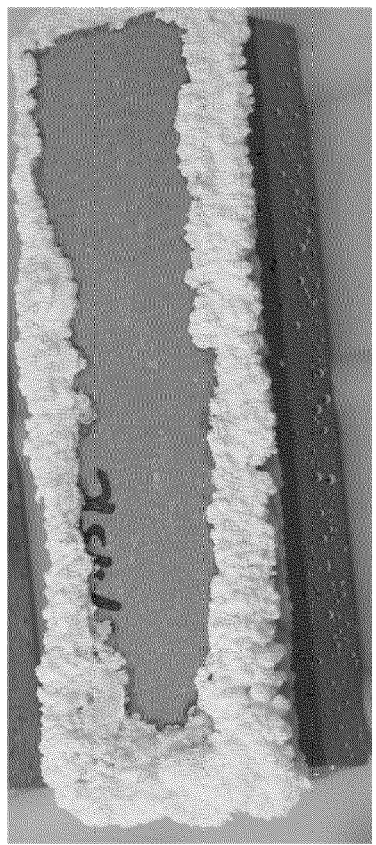
Figure 5C:
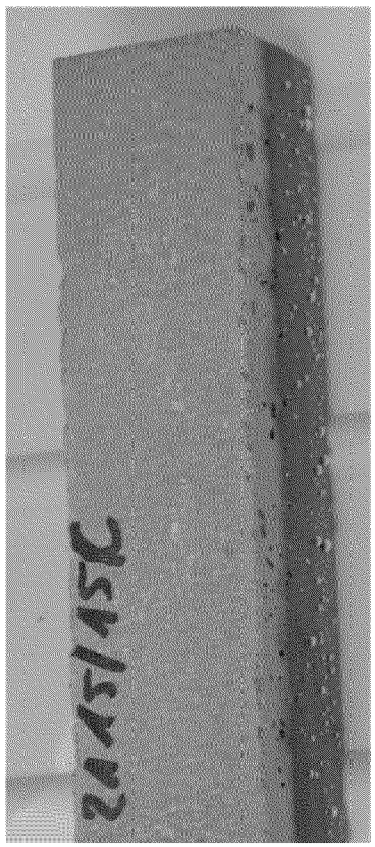
Figure 5D:
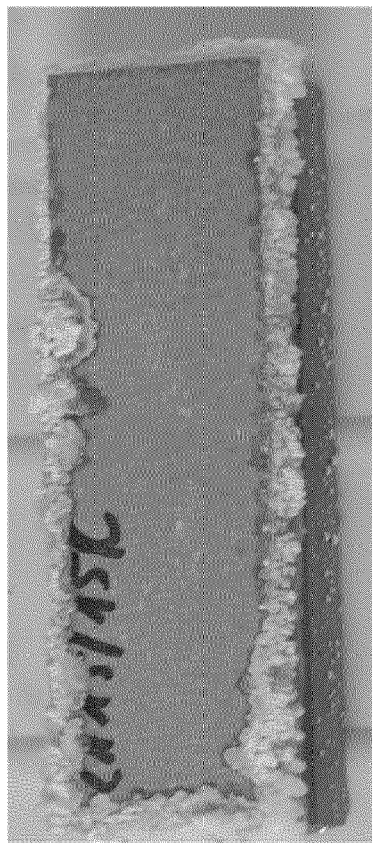
Figure 6A:
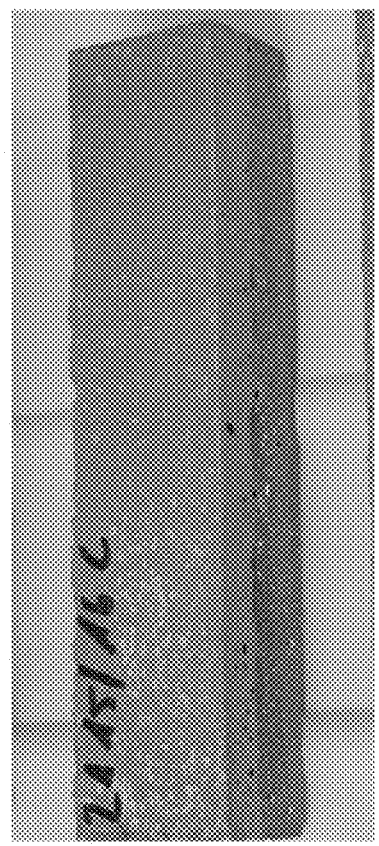
FIGS. 6A-6D are photographs of the test specimens according to Example 8.4c after a test time according to Example 9 of one hour (1 h), 24 hours (24 h), one week (1 W) and two weeks (2 W), respectively.
Figure 6B:
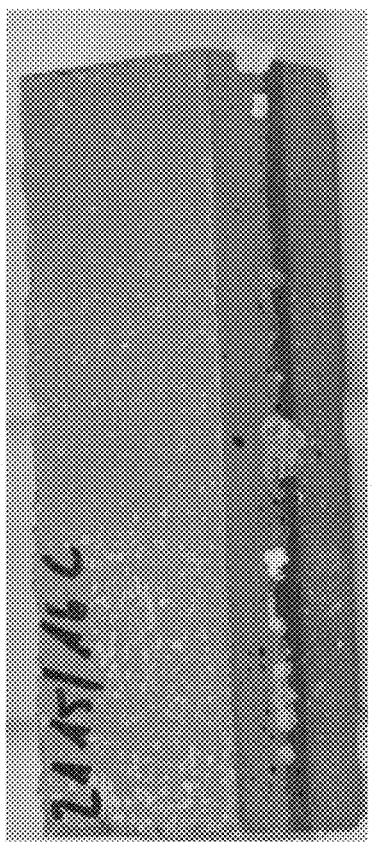
Figure 6C:
Figure 6D:

The compositions according to the invention and a process for the preparation thereof are described by way of example below without the description being intended to limit the invention to these exemplary embodiments. Where ranges, general formulae or classes of compounds are mentioned below, these are intended to comprise not only the corresponding ranges or groups of compounds which are explicitly mentioned but also all part-ranges and part-groups of compounds which can be obtained by removal of individual values (ranges) or compounds. Where documents are cited in the present description, the complete content thereof is intended to be part of the disclosure content of the present invention. Where compounds, such as, for example, organomodified polysiloxanes, which may have different units several times, are described within the scope of the present invention, they may occur in random distribution (random oligomer) or in an ordered manner (block oligomer) in these compounds. Information on the number of units in such compounds are to be understood as being average values, averaged over all corresponding compounds.

The proportion of cement is preferably understood as meaning the sum of all compounds selected from CaO, $SiO_2$, $Al_2O_3$, $Fe_2O_3$ and $CaSO_4$, the solid solutions thereof, such as, for example, aluminium silicates, ferrosilicates or the like, and the corresponding compounds containing water of crystallization.

The cement-containing compositions according to the invention are distinguished in that they have a proportion of organosilicon compounds of greater than 0.15% by weight, preferably greater than 0.20 to 5% by weight, more preferably greater than 0.25 to 1% by weight and particularly preferably 0.3 to 0.5% by weight, based on the proportion of cement, the organosilicon compounds being based on at least one organosilicon compound selected from the group consisting of the alkoxysilanes and at least one selected from the group consisting of alkoxysiloxanes.

Of the organosilicon compounds, preferably 5 to 95% by weight are based on alkoxysilanes of the general formula (I)

$$R^1\text{—Si—}(OR^2)_3 \qquad (I)$$

in which
$R^1$ is an alkyl radical having 1 to 16, preferably 3 to 12, carbon atoms, and
$R^2$ is an alkyl radical having 1 to 4 carbon atoms, preferably a methyl or ethyl radical, and
95 to 5% by weight are based on alkoxysiloxanes of the general formula (II)

$$R^3{}_a\text{—Si—}(OR^4)_b$$
$$\qquad |$$
$$\quad O_{[4-(a+b)]/2} \qquad (II)$$

in which
$R^3$ is an alkyl radical having 1 to 6 carbon atoms, and
$R^4$ is an alkyl radical having 1 to 4 carbon atoms, preferably a methyl or ethyl radical,
a is 0.8 to 1.2, and
b is 0.2 to 1.2.

Of the organosilicon compounds, particularly preferably 5 to 95% by weight are based on alkoxysilanes of the general formula (I)

$$R^1\text{—Si—}(OR^2)_3 \qquad (I)$$

in which
$R^1$ is an alkyl radical having 1 to 16, preferably 3 to 12, carbon atoms, and
$R^2$ is an alkyl radical having 1 to 4 carbon atoms, preferably a methyl or ethyl radical, and
95 to 5% by weight are based on a mixture consisting of
d1) a silane of the general formula (III)

$$R^6\text{—Si—}(OR^5)_3 \qquad (III)$$

in which $R^5$ is an alkyl radical having 1 to 4 carbon atoms, preferably a methyl or ethyl radical, and $R^6$ denotes an aminoalkyl radical having 1 to 6 carbon atoms, a radical of the general formula (IV)

in which $R^7$ denotes a —O—, —S—, —NH— or —NH—CH$_2$—CH$_2$—NH— radical, x is greater than or equal to 2, and y is greater than or equal to 2, or is a radical of the general formula (V)

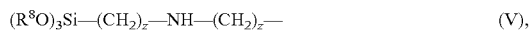

in which $R^8$ denotes an alkyl radical having 1 to 4 carbon atoms, preferably a methyl or ethyl radical, and z is greater than or equal to 2,

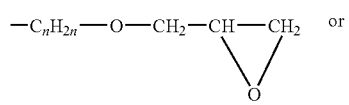

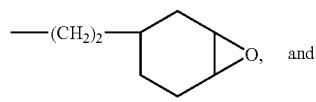

n denotes an integer from 1 to 5, and d2) a polysiloxane of the general formula (VIII)

in which $R^9$ is identical or different and is a methyl or phenyl radical, but at least 90% of the radicals $R^9$ are methyl radicals and m is 20 to 250, the ratio of d1) to d2) is kept so that an SiOH group of the compound d2) corresponds to >1 to 3 OR$^5$ groups of the compound d1).

Preferred compositions are those in which, in the organosilicon compounds, $R^1$ is an alkyl radical having 3 to 8 carbon atoms, $R^2$ is a methyl or ethyl radical, $R^5$ is an H$_2$N—(CH$_2$)$_3$— or an H$_2$N—(CH$_2$)$_3$—NH—(CH$_2$)— radical or a radical of the formulae

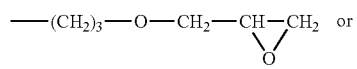

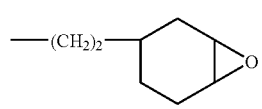

and $R^9$ is exclusively a methyl radical, and m has a value from 30 to 80.

Other preferred compositions are those in which up to 50% by weight of the component d) are replaced by equal amounts of a siloxane of the formula

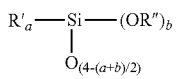

where R'=alkyl radical having 1 to 8 carbon atoms or a phenyl radical, R''=an alkyl radical having 1 to 4 carbon atoms, a=0.8 to 1.2 and b=0.2 to 1.2.

It may be advantageous if, in the composition according to the invention, the organosilicon compounds are at least one compound selected from the group consisting of the alkoxysilanes and at least one compound selected from the group consisting of the alkoxysiloxanes (and not only based on these). This has the advantage that such compounds are easy to prepare.

In a further advantageous embodiment of the composition according to the invention, the organosilicon compounds are obtained by reacting at least one compound selected from the group consisting of the alkoxysilanes and at least one compound selected from the group consisting of the alkoxysiloxanes. By the use of such organosilicon compounds which are obtained by reaction, they can be particularly readily tailored to the other constituents of the composition.

The reaction can be carried out at different temperatures and pressures. Preferably, the reaction is effected at a temperature of 150 to 200° C.

The amount of alkoxysiloxanes and alkoxysilanes used in the reaction may vary over a wide range. Preferably, the stoichiometric ratio of alkoxysiloxanes to alkoxysilanes is from 1:1000 to 1000:1. The reaction is preferably carried out in stoichiometric amounts.

The reaction can be effected completely or only partly. In one embodiment, the reaction is preferably effected completely.

The composition according to the invention may be, for example, concrete or an artificial stone. This concrete or these stones may be part of a larger architectural structure, such as, for example, of a house, of a wall, of a bridge or the like. The composition according to the invention can be used for the production of structures, in particular roofs, floors, walls and other elements of structures. The invention accordingly also relates to architectural structures or parts thereof, such as, for example, of a house, of a wall, of a bridge or the like, for example roofs, floors, walls or the like, which were obtained with the use of compositions according to the invention or contain the compositions according to the invention or consist thereof.

If the composition is a concrete, this may be a wet, dry or semi-dry concrete. A concrete is designated as wet if it has a weight ratio of water to cement of greater than 0.5. A concrete is designated as semi-dry if it has a weight ratio of water to cement of from 0.4 to 0.5. A concrete is designated as dry if it has a weight ratio of water to cement of 0.3 to less than 0.4. Preferably, the composition according to the invention is a semi-dry concrete.

The cement-containing compositions according to the invention can be obtained in various ways by mixing the individual components. Preferably, cement-containing compositions according to the invention are obtained by the process described below.

The process according to the invention for the preparation of hardened cement-containing compositions, by addition of an aqueous emulsion which has at least one organosilicon compound which is based on at least one compound selected from the group consisting of the alkoxysilanes and at least one compound selected from the group consisting of the alkoxysiloxanes to a cement-containing, flowable mixture and final hardening of the mixture is distinguished in that the emulsion is added to the mixture in an amount such that the proportion of the organosilicon compounds in the cement-containing composition is greater than 0.15% by weight, preferably 0.2 to 5% by weight, more preferably 0.25 to 1% by weight and particularly preferably 0.3 to 0.5% by weight, based on the proportion of cement. Preferably, the emulsion added to the mixture has a proportion of 0.35 to 6.5% by weight of organosilicon compounds, based on the emulsion.

Preferably >2% by weight, preferably 3% to 77% by weight, preferably 4 to 7.7% by weight, of aqueous emulsion is added to the mixture.

It may be advantageous if an emulsion, which preferably has from 1 to 10% by mass, preferably from 3 to 5% by mass, of one or more emulsifiers selected from anionic, cationic or nonionogenic emulsifiers and mixtures thereof is used in the process according to the invention. If the preferred proportion of emulsifiers is exceeded, this may lead to a deterioration in the water repellency of the concrete or artificial stone. An emulsion which has nonionogenic emulsifiers, i.e., adducts of alkylene oxides, preferably ethylene oxide, with compounds having active hydrogen, such as fatty alcohols, alkylphenols, such as octylphenol, nonylphenol or dodecylphenol, is preferably used. The content of oxyethylene units should preferably be so high that the HLB value of the emulsifiers is from 6 to 20, preferably 10 to 18.

Emulsions preferably used in the process according to the invention are those which have organosilicon compounds which are based on
5 to 95% by weight of alkoxysilanes of the general formula (I)

  (I)

in which
$R^1$ is an alkyl radical having 1 to 16, preferably 3 to 12, carbon atoms, and
$R^2$ is an alkyl radical having 1 to 4 carbon atoms, preferably a methyl or ethyl radical, and
95 to 5% by weight of alkoxysiloxanes of the general formula (II)

  (II)

in which
$R^3$ is an alkyl radical having 1 to 6 carbon atoms, and
$R^4$ is an alkyl radical having 1 to 4 carbon atoms, preferably a methyl or ethyl radical,
a is 0.8 to 1.2, and
b is 0.2 to 1.2.

Emulsions preferably used in the process according to the invention are those which have organosilicon compounds which are based on
5 to 95% by weight of alkoxysilanes of the general formula (I)

  (I)

in which
$R^1$ is an alkyl radical having 1 to 16, preferably 3 to 12, carbon atoms, and
$R^2$ is an alkyl radical having 1 to 4 carbon atoms, preferably a methyl or ethyl radical, and
95 to 5% by weight of a mixture consisting of
d1) a silane of the general formula (III)

  (III)

in which
$R^5$ is an alkyl radical having 1 to 4 carbon atoms, preferably a methyl or ethyl radical, and
$R^6$ denotes an aminoalkyl radical having 1 to 6 carbon atoms, a radical of the general formula (IV)

  (IV), in which
$R^7$ denotes a —O—, —S—, —NH— or —NH—CH$_2$—CH$_2$—NH— radical,
x is greater than or equal to 2 and
y is greater than or equal to 2, or is a radical of the general formula (V)

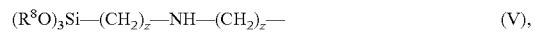  (V), in which
$R^8$ denotes an alkyl radical having 1 to 4 carbon atoms, preferably a methyl or ethyl radical, and
z is greater than or equal to 2,

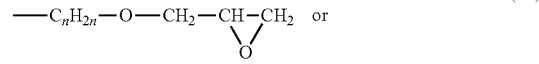  (VI)

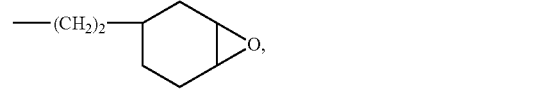  (VII)

and n denotes an integer from 1 to 5,
and
d2) a polysiloxane of the general formula (VIII)

  (VIII)

in which
$R^9$ is identical or different and is a methyl or phenyl radical, but at least 90% of the radicals $R^9$ are methyl radicals, and m is 20 to 250, the ratio of d1) to d2) being kept so that an SiOH group of the compound d2) corresponds to >1 to 3 $OR^5$ groups of the compound d1).

Emulsions particularly preferably used in the process according to the invention are those which have organosilicon compounds which are based on compounds of the formulae I, III and VIII and in which
$R^1$ is an alkyl radical having 3 to 8 carbon atoms,
$R^2$ is a methyl or ethyl radical,
$R^5$ is an H$_2$N—(CH$_2$)$_3$— or an H$_2$N—(CH$_2$)$_3$—NH—(CH$_2$)— radical or a radical of the formulae

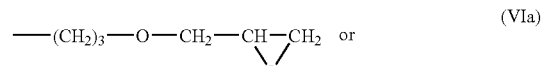  (VIa)

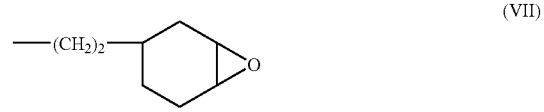  (VII)

and
$R^9$ is exclusively a methyl radical and
m has a value from 30 to 80.

It may be advantageous if organosilicon compounds in which up to 50% by weight of the component d) are replaced by equal amounts of a siloxane of the formula IX

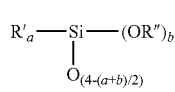

(IX)

where R' alkyl radical having 1 to 8 carbon atoms or a phenyl radical, R" an alkyl radical having 1 to 4 carbon atoms, a=0.8 to 1.2 and b=0.2 to 1.2, are used.

The preparation of the emulsion according to the invention can be effected in such a way that the constituents are emulsified separately or a mixture of the constituents is emulsified together. Preferably, the emulsifier is added to the component to be emulsified (or to a mixture thereof) and the emulsifier-containing mixture is optionally heated. The water is then added to this mixture with thorough stirring. The emulsion forming or formed can be homogenized by means of suitable stirring apparatuses, which preferably operate according to the rotor/stator principle. It may be advantageous to use colloid mills for reducing the particle size of the emulsified phase.

The organosilicon compounds used in the process according to the invention can be obtained by reacting at least one compound selected from the group consisting of the alkoxysilanes and at least one compound selected from the group consisting of the alkoxysiloxanes. The reaction can be effected as described above.

The final hardening can be effected in air, and it may be necessary to introduce additional water for complete hydration.

The present invention is illustrated in more detail by FIG. 1 without it being intended to limit the invention thereto. Specifically, FIG. 1 shows the dependence of the water absorption on the proportion of the organosilicon compound in the form of a graph. Usually, in the hydrophobing, a reduction of the water absorption by more than 70% is designated as good. As shown in FIG. 1, a reduction of the water absorption by more than 70% is achieved only on addition of more than 0.1% by mass of organosilicon compounds.

The subject of the present invention will be explained in more detail below with reference to examples, without it being intended to limit the scope of protection of the invention, which is evident from the description and the patent claims, to these exemplary embodiments.

EXAMPLES

Example 1

Preparation of an Emulsion to be Used According to the Invention 6.86 g of gamma-aminopropyltriethoxysilane (Dynasylan® AMEO, Evonik Degussa GmbH) were mixed with 93.14 g of a polysiloxanediol (terminal OH groups) having an average molecular weight (weight average) of 4000 (g/mol). This gave a molar ratio of polysiloxanediol:aminoalkylsilane=3:4. 150 g of octyltriethoxysilane were added to the mixture.

25 g of an emulsifier mixture consisting of an ethoxylated triglyceride having an HLB value of 18 and an ethoxylated fatty alcohol having an HLB value of 11 in the weight ratio of 6:4 were dissolved in 225 g of water. The silane/siloxane mixture was stirred into this solution and processed by means of an emulsifying machine (gap homogenizer) to give a stable emulsion.

Example 2

Preparation of an Emulsion to be Used According to the Invention

A mixture of 100 g of polysiloxanediol having a molecular weight of 6803 (g/mol) and 32.5 g of gamma-aminopropyltriethoxysilane (Dynasylan® AMEO, Evonik Degussa GmbH) was heated to 180° C. with stirring and while passing through nitrogen and was kept at this temperature for about 4 hours until 8.8 g of ethanol had been expelled. The product formed was then cooled to room temperature.

125 g of this product were mixed with 125 g of isobutyltrimethoxysilane. 20 g of an emulsifier mixture consisting of an ethoxylated alkylphenol and a methyl-polyoxyethylene (15)cocoammonium chloride in the weight ratio 1:1 were added to the formulation and, after addition of 355 g of water, the mixture was processed with an apparatus operating according to the rotor/stator principle to give an emulsion.

Example 3

Preparation of an Emulsion to be Used According to the Invention 3200 g of polysiloxanediol having an average molecular weight of 10 666 g/mol and 94.4 g of 3-glycidyloxypropyltrimethoxysilane (Dynasylan® GLYMO, Evonik Degussa GmbH) were mixed with one another. This mixture was heated to 170° C. while stirring and passing through nitrogen. After about 5 hours, 11.5 g of methanol had been expelled. The reaction product formed was then cooled to room temperature (23° C.).

25 g of an emulsifier mixture consisting of an ethoxylated fatty alcohol and an alkylaryl sulphonate in a ratio of 3:7 were dissolved in 225 g of water. This solution was mixed with 140 g of the reaction product obtained above and 110 g of n-propyltriethoxy-silane. The coarse emulsion obtained was pumped three times through a gap homogenizer. A stable emulsion was formed.

Example 4

Preparation of an Emulsion to be Used According to the Invention 5.15 g of gamma-aminopropyltriethoxysilane (Dynasylan® AMEO, Evonik Degussa GmbH) were mixed with 69.85 g of polysiloxanediol having a molecular weight of 4000 and 25 g of a siloxane of the general formula (X)

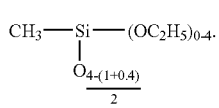

(X)

150 g of octyltriethoxysilane were added to the mixture.

25 g of an emulsifier mixture consisting of a triglyceride having an HLB value of 18 and an ethoxylated fatty alcohol having an HLB value of 11 in the weight ratio of 6:4 were dissolved in 225 g of water. The solution was stirred into the silane/siloxane mixture and processed by means of an emulsifying machine (gap homogenizer) to give a stable emulsion.

Example 5

3.43 g of gamma-aminopropyltriethoxysilane were mixed with 46.57 g of a polysiloxanediol having a molecular weight of 4000 and 50 g of a siloxane of the general formula (XI)

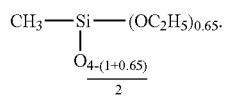

150 g of octyltriethoxysilane were added to the mixture.

25 g of an emulsifier mixture consisting of a triglyceride having an HLB value of 18 and an ethoxylated fatty alcohol having an HLB value of 11 in the weight ratio of 6:4 were dissolved in 225 g of water. The solution was stirred into the silane/siloxane mixture and processed by means of an emulsifying machine (gap homogenizer) to give a stable emulsion.

Testing of Performance Characteristics

Example 6

Production of Test Specimens

The emulsions were used for the preparation of a cementitious mixture. For this purpose, those amounts of emulsion and cement constituents which are stated in the following examples were mixed in a concrete mixer. The mass ratio of sand to cement was 3:1. The weight ratio of water to cement was 0.4. The cement used was standard cement CEM I 42.5 R.

Artificial stones having a height of 50 mm, width of 50 mm and length of 160 mm were cast as test specimens from this composition. After drying for 28 days under standard climatic conditions (23° C., 50% relative humidity) in a conditioned chamber, the water absorptivity was determined as described below.

Example 7

Determination of the Water Absorption

After determination of the weight of the respective test specimen, the latter was stored under water for 24 hours. The water column above was 5 cm. After removal, the externally adhering water was removed with filter paper. The test specimens were weighed again. The water absorption was calculated according to the following formula:

water absorption (% by mass)=$(a-b)*100/b$, where a is the weight of the test specimen after storage in water and b is the weight of the test specimen before storage in water.

According to Example 6, test specimens which comprised an amount of emulsion according to Example 1 such that the content of organosilicon compounds, based on the proportion of cement, was 0, 0.1, 0.2, 0.3, 0.4 and 0.5% by mass were produced.

The result of the determination of the water absorption is shown in Table 1.

TABLE 1

Results of Example 7

| Content of organosilicon compounds (% by mass) | Water absorption (% by mass) |
|---|---|
| 0 | 7.8 |
| 0.1 | 4.4 |
| 0.2 | 2.4 |
| 0.3 | 1.8 |
| 0.4 | 1.1 |
| 0.5 | 0.9 |

In FIG. 1, the result is plotted in the form of a graph. It is clearly evident that the desired reduction of the water absorption by 70% or more is achieved only from a content of organosilicon compounds of more than 0.1% by mass.

Example 8

Determination of the Capillary Water Absorption

The method serves for determining the water absorption of building materials which form through capillary or absorptive forces. The water absorption per unit area is determined without significant excess pressure by surface wetting on the basis of DIN 52617.

Material and Reagents

The test specimens were cut to the size 50 mm×50 mm×50 mm.

Laboratory balance (0.1 g indication)
Immersion container with plastic grating
Waterbath with water-saturated flexible polyurethane foam (25-30 g/l density)
Crucible tongs
Stopwatch After being reduced to the abovementioned size, the test specimens produced as in Example 6 were stored on the water-saturated flexible polyurethane foam. As a result of their own weight, the samples press water out of the foam so that continuous contact of the resting surface with the water is ensured.

By weighing after 1 h, 4 h, 9 h and 25 h, the water absorption in g/m² was monitored. Before each weighing, superficial adhering water was dripped off with an absorptive paper cloth. Sufficiently good water repellency is present if reduction of the water absorption by greater than or equal to 70%, based on the blank value, is achieved.

Test specimens which were produced by using the compositions according to Example 6, mentioned in Table 2, were used. In the table, the meanings are as follows Rheopel: Rheopel® Plus, BASF SE, silane-based water repellent.
CSD: Nopcote® CSD, a 50% strength calcium stearate dispersion, obtainable from GEO Specialty Chemicals.
IE6694: Water-dilutable, silicone-containing composition for water-repellent treatment of porous construction materials from Dow Corning®.

TABLE 2

Composition of the test specimens for Example 8

| Example | Water repellent | Proportion by mass, based on the proportion of cement |
|---|---|---|
| 8.0 | none | 0 |
| 8.1a | according to Example 1 | 0.2 |

TABLE 2-continued

Composition of the test specimens for Example 8

| Example | Water repellent | Proportion by mass, based on the proportion of cement |
|---|---|---|
| 8.1b | according to Example 1 | 0.4 |
| 8.1c | according to Example 1 | 0.8 |
| 8.1d | according to Example 1 | 1.66 |
| 8.2a | Rheopel | 0.2 |
| 8.2b | Rheopel | 0.4 |
| 8.2c | Rheopel | 0.8 |
| 8.2d | Rheopel | 1.66 |
| 8.3a | CSD | 0.2 |
| 8.3b | CSD | 0.4 |
| 8.3c | CSD | 0.8 |
| 8.3d | CSD | 1.66 |
| 8.4a | IE 6694 | 0.2 |
| 8.4b | IE 6694 | 0.4 |
| 8.4c | IE 6694 | 0.8 |
| 8.4d | IE 6694 | 1.66 |

The results of the capillary water absorption as a function of time are listed in Table 3.

TABLE 3

Results of the determination of the capillary water absorption (after 0.5, 1, 2, 4, 9 and 25 hours)

| Example | 0.5 h | 1 h | 2 h | 4 h | 9 h | 25 h |
|---|---|---|---|---|---|---|
| 8.0 | 304.7 | 421.9 | 585.9 | 867.2 | 1156.3 | 1562.5 |
| 8.1a | 23.4 | 39.1 | 78.1 | 140.6 | 234.4 | 429.7 |
| 8.1b | 0.0 | 0.0 | 23.4 | 85.9 | 164.1 | 335.9 |
| 8.1c | 0.0 | 7.8 | 39.1 | 85.9 | 148.4 | 265.6 |
| 8.1d | 0.0 | 15.6 | 54.7 | 101.6 | 148.4 | 257.8 |
| 8.2a | 62.5 | 101.6 | 148.4 | 242.2 | 351.6 | 585.9 |
| 8.2b | 70.3 | 117.2 | 148.4 | 218.7 | 289.1 | 484.4 |
| 8.2c | 39.1 | 70.3 | 93.8 | 156.3 | 218.7 | 375.0 |
| 8.2d | 15.6 | 46.9 | 85.9 | 140.6 | 195.3 | 320.3 |
| 8.3a | 398.4 | 500.0 | 601.6 | 750.0 | 890.6 | 1148.4 |
| 8.3b | 414.1 | 507.8 | 617.2 | 734.4 | 851.6 | 1062.5 |
| 8.3c | 304.7 | 351.6 | 437.5 | 531.2 | 570.3 | 718.7 |
| 8.3d | 210.9 | 289.1 | 343.8 | 437.5 | 562.5 | 593.8 |
| 8.4a | 195.3 | 281.3 | 382.8 | 546.9 | 718.8 | 992.2 |
| 8.4b | 70.3 | 117.2 | 187.5 | 296.9 | 375.0 | 554.7 |
| 8.4c | 101.6 | 132.8 | 195.3 | 273.4 | 351.6 | 507.8 |
| 8.4d | 54.7 | 101.6 | 117.2 | 164.1 | 218.7 | 351.6 |

The results clearly show that compositions according to the invention exhibit a substantially lower capillary water absorption than the compositions known to date.

Example 9

Optical Determination of the Tendency to Form Efflorescence

Investigations of the occurrence of efflorescence were carried out with test specimens according to Examples 8.0, 8.1c, 8.2c, 8.3c and 8.4c of Table 8, produced as described in Examples 6 and 8. For this purpose, the stones were stored for up to 2 weeks in a 10% strength by mass aqueous sodium sulphate solution, the solution standing about 3 mm above the top of the test specimen. A check is carried out to determine whether the sodium sulphate solution penetrates and leaves behind salt deposits on the surface after drying.

FIGS. 2A, 3A, 4A, 5A and 6A are photographs of the test specimens after a test time of one hour (1 h). FIGS. 2B, 3B, 4B, 5B and 6B are photographs of the test specimens after a test time of 24 hours (24 h), FIGS. 2C, 3C, 4C, 5C and 6C are photographs of the test specimens after a test time of one week (1 W). FIGS. 2D, 3D, 4D, 5D and 6D are photographs of the test specimens after a test time of two weeks (2 W). It is clearly evident that the use of the compositions according to the invention (see, FIGS. 3A-3D) lead to excellent efflorescence behavior of the test specimens.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A cement-containing composition comprising a proportion of organosilicon compounds of from 0.25 to 1% by weight, based on the proportion of cement, said organosilicon compounds are based on at least one organosilicon compound selected from the group consisting of alkoxysilanes and at least one selected from the group consisting of alkoxysiloxanes.

2. The composition according to claim 1, wherein said organosilicon compounds are based on
a) 5 to 95% by weight of alkoxysilanes of general formula (I)

$$R^1\text{—}Si\text{—}(OR^2)_3 \tag{I}$$

in which
$R^1$ is an alkyl radical having 1 to 16 carbon atoms, and
$R^2$ is an alkyl radical having 1 to 4 carbon atoms, and
b) 95 to 5% by weight of alkoxysiloxanes of general formula (II)

$$R^3_a\text{—}Si\text{—}(OR^4)_b \\ | \\ O_{[4-(a+b)]/2} \tag{II}$$

in which
$R^3$ is an alkyl radical having 1 to 6 carbon atoms,
$R^4$ is an alkyl radical having 1 to 4 carbon atoms,
a is 0.8 to 1.2, and
b is 0.2 to 1.2.

3. The composition according to claim 1 wherein said organosilicon compounds are based on
c) 5 to 95% by weight of alkoxysilanes of general formula (I)

$$R^1\text{—}Si\text{—}(OR^2)_3 \tag{I}$$

in which
$R^1$ is an alkyl radical having 1 to 16 carbon atoms, and
$R^2$ is an alkyl radical having 1 to 4 carbon atoms, and
d) 95 to 5% by weight of a mixture consisting of
d1) a silane of general formula (III)

$$R^6\text{—}Si\text{—}(OR^5)_3 \tag{III}$$

in which
$R^5$ is an alkyl radical having 1 to 4 carbon atoms,
$R^6$ denotes an aminoalkyl radical having 1 to 6 carbon atoms,
a radical of general formula (IV), $$H_2N\text{—}(CH_2)_x R^7\text{—}(CH_2)_y\text{—} \tag{IV},$$

in which
$R^7$ denotes a —O—, —S—, —NH— or —NH—CH$_2$—CH$_2$—NH— radical,
x is greater than or equal to 2, and y is greater than or equal to 2, or is a radical of general formula (V)

$$(R^8O)_3Si—(CH_2)_z—NH—(CH_2)_z— \quad (V),$$

in which
$R^8$ denotes an alkyl radical having 1 to 4 carbon atoms, and z is greater than or equal to 2, $$—C_nH_{2n}—O—CH_2—CH\underset{O}{\overset{}{—}}CH_2 \quad \text{or} \quad (VI)$$

$$—(CH_2)_2-\underset{\phantom{O}}{\bigcirc}\!\!\!\!\!\!\bigtriangleup O, \quad (VII)$$

and n denotes an integer from 1 to 5, and
d2) a polysiloxane of general formula (VIII)

$$HO—[Si(R^9)_2O]_m—H \quad (VIII)$$

in which
$R^9$ is identical or different and is a methyl or phenyl radical, but at least 90% of the radicals $R^9$ are methyl radicals and m is 20 to 250, the ratio of d1) to d2) being kept so that an SiOH group of the compound d2) corresponds to >1 to 3 $OR^5$ groups of the compound d1).

4. The composition according to claim 3, wherein
$R^1$ is an alkyl radical having 3 to 8 carbon atoms,
$R^2$ is a methyl or ethyl radical,
$R^5$ is an $H_2N—(CH_2)_3—$ or an $H_2N—(CH_2)_3—NH—(CH_2)—$ radical or a radical of formula $$—(CH_2)_3—O—CH_2—CH\underset{O}{\overset{}{—}}CH_2 \quad \text{or} \quad (VIa)$$

$$—(CH_2)_2-\underset{\phantom{O}}{\bigcirc}\!\!\!\!\!\!\bigtriangleup O \quad (VII)$$

and
$R^9$ is exclusively a methyl radical, and
m has a value from 30 to 80.

5. The composition according to claim 3, wherein up to 50% by weight of the component d) are replaced by equal amounts of a siloxane of formula $$R'_a—Si—(OR'')_b$$
$$\big|$$
$$O_{(4-(a+b)/2)}$$

where R'=alkyl radical having 1 to 8 carbon atoms or a phenyl radical, R''=an alkyl radical having 1 to 4 carbon atoms, a=0.8 to 1.2 and b=0.2 to 1.2.

6. The composition according to claim 1, wherein said organosilicon compounds are at least one compound selected from the group consisting of the alkoxysilanes and at least one compound selected from the group consisting of the alkoxysiloxanes.

7. The composition according to claim 6, wherein the reaction is carried out at a temperature of 150° C. to 200° C.

8. The composition according to claim 1, wherein said composition is in the form of concrete or an artificial stone.

9. Structures or parts thereof which contain a composition according to claim 1.

10. A process for the preparation of a hardened cement-containing composition comprising:
adding an aqueous emulsion to a cement-containing, flowable mixture, wherein said aqueous emulsion includes organosilicon compounds which are based on at least one compound selected from the group consisting of alkoxysilanes and at least one compound selected from the group consisting of alkoxysiloxanes, and said aqueous emulsion is added in an amount such that the proportion of the organosilicon compounds in the cement-containing, flowable composition is from 0.25 to 1% by weight, based on the proportion of cement; and
hardening the mixture.

11. The process according to claim 10, wherein the aqueous emulsion is added has a proportion of 1 to 75% by weight of organosilicon compounds, based on the emulsion.

12. The process according to claim 10, wherein more than 2% by weight of aqueous emulsion is added to the mixture.

13. The process according to claim 10, wherein said emulsion is used which has 1 to 10% by mass of one or more emulsifiers selected from anionic, cationic and nonionogenic emulsifiers or mixtures.

14. The process according claim 10, wherein said organosilicon compounds are based on
a) 5 to 95% by weight of alkoxysilanes of general formula (I)

$$R^1—Si—(OR^2)_3 \quad (I)$$

in which
$R^1$ is an alkyl radical having 1 to 16 carbon atoms, and
$R^2$ is an alkyl radical having 1 to 4 carbon atoms, and
b) 95 to 5% by weight of alkoxysiloxanes of general formula (II)

$$R^3_a—Si—(OR^4)_b \quad (II)$$
$$\big|$$
$$O_{[4-(a+b)]/2}$$

in which
$R^3$ is an alkyl radical having 1 to 6 carbon atoms,
$R^4$ is an alkyl radical having 1 to 4 carbon atoms,
a is 0.8 to 1.2, and
b is 0.2 to 1.2.

15. The process according to claim 10 wherein said organosilicon compounds are based on
c) 5 to 95% by weight of alkoxysilanes of general formula (I)

$$R^1—Si—(OR^2)_3 \quad (I)$$

in which
$R^1$ is an alkyl radical having 1 to 16 carbon atoms and
$R^2$ is an alkyl radical having 1 to 4 carbon atoms, and
d) 95 to 5% by weight of a mixture consisting of
d1) a silane of the general formula (III)

$$R^6—Si—(OR^5)_3 \quad (III)$$

in which
$R^5$ is an alkyl radical having 1 to 4 carbon atoms,
$R^6$ denotes an aminoalkyl radical having 1 to 6 carbon atoms,
a radical of general formula (IV)

$$H_2N—(CH_2)_x R^7—(CH_2)_y— \quad (IV),$$

in which
$R^7$ denotes a —O—, —S—, —NH— or —NH—CH$_2$—CH$_2$—NH— radical,
x is greater than or equal to 2, and
y is greater than or equal to 2, or is a radical of general formula (V), $(R^8O)_3Si$—$(CH_2)_z$—NH—$(CH_2)_z$— (V), in which $R^8$ denotes an alkyl radical having 1 to 4 carbon atoms, and
z is greater than or equal to 2,

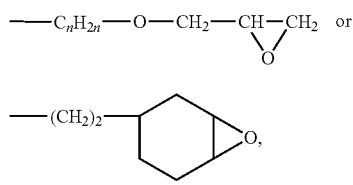    (VI)

(VII)

and n denotes an integer from 1 to 5, and
d2) a polysiloxane of general formula (VIII)

HO—[Si(R$^9$)$_2$O]$_m$—H (VIII)

in which
$R^9$ is identical or different and is a methyl or phenyl radical, but at least 90% of the radicals $R^9$ are methyl radicals and m is 20 to 250, the ratio of d1) to d2) being kept so that an SiOH group of the compound d2) corresponds to >1 to 3 OR$^5$ groups of the compound d1).

16. The process according to claim 15, wherein
$R^1$ is an alkyl radical having 3 to 8 carbon atoms,
$R^2$ is a methyl or ethyl radical,
$R^5$ is an H$_2$N—(CH$_2$)$_3$— or an H$_2$N—(CH$_2$)$_3$—NH—(CH$_2$)— radical or a radical of formula

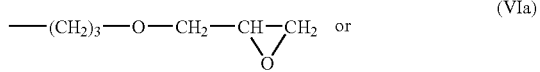 (VIa)

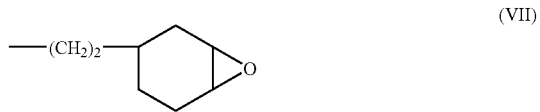 (VII)

and
$R^9$ is exclusively a methyl radical and
m has a value from 30 to 80.

17. The process according to claim 15, wherein up to 50% by weight of the component d) are replaced by equal amounts of a siloxane of formula

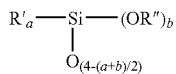

where R'=alkyl radical having 1 to 8 carbon atoms or a phenyl radical, R"=an alkyl radical having 1 to 4 carbon atoms, a=0.8 to 1.2 and b=0.2 to 1.2.

18. The process according to claim 10, wherein said organosilicon compounds are obtained by reacting at least one compound selected from the group consisting of the alkoxysilanes and at least one compound selected from the group consisting of the alkoxysiloxanes.

19. The process according to claim 18, wherein the reaction is carried out at a temperature of 150° C. to 200° C.

* * * * *